(12) United States Patent
Pieroni et al.

(10) Patent No.: US 6,439,031 B1
(45) Date of Patent: Aug. 27, 2002

(54) METHOD FOR DETECTING LEAKS IN A FLUID SYSTEM

(75) Inventors: Kenneth Alan Pieroni, Fullerton; Denise Yvette Haddad, Mission Viejo; Jim Eli Saffie, Santa Monica, all of CA (US)

(73) Assignee: STAR EnviroTech, Inc., Costa Mesa, CA (US)

( * ) Notice: Subject to any disclaimer, the term of this patent is extended or adjusted under 35 U.S.C. 154(b) by 0 days.

(21) Appl. No.: 09/385,050

(22) Filed: Aug. 30, 1999

(51) Int. Cl.[7] ................................ G01M 3/04
(52) U.S. Cl. ................................... 73/40.7
(58) Field of Search ............ 102/334; 73/40.7

(56) References Cited

U.S. PATENT DOCUMENTS

| | | | | |
|---|---|---|---|---|
| 3,683,675 A | * | 8/1972 | Burton, Jr. et al. | 73/40.7 |
| 4,155,249 A | * | 5/1979 | Scott | 73/40.7 |
| 4,439,341 A | * | 3/1984 | Swiatosz | 252/305 |
| 4,697,520 A | * | 10/1987 | Brassert et al. | 102/334 |
| 4,754,638 A | * | 7/1988 | Brayman et al. | 73/40.7 |
| 5,094,168 A | * | 3/1992 | Rumer | 73/40.7 |
| H1124 H | * | 1/1993 | Rouse et al. | 60/39.75 |
| 5,859,363 A | * | 1/1999 | Gouge | 73/40.7 |
| 5,922,944 A | * | 7/1999 | Pieroni et al. | 73/40.7 |
| 6,189,453 B1 | * | 2/2001 | Lin | 102/334 |

* cited by examiner

Primary Examiner—Hezron Williams
Assistant Examiner—C D Garber
(74) Attorney, Agent, or Firm—Morland C. Fischer

(57) ABSTRACT

A method for detecting leaks in a fluid system such as, but not limited to, the evaporative or air brake system of a motor vehicle. A smoke generating machine produces a supply of smoke to be delivered to the system under test. At least some of a mixture of oil and fluorescent dye is heated and vaporized into smoke within a sealed chamber. The smoke functions as a carrier for the dye. Some of the smoke which is delivered to the system under test from the chamber will exit a leak (e.g. a hole), and the fluorescent dye carried by the smoke will leave a fluorescent trace around the leak. By shining ultraviolet light along the system under test, the fluorescent trace around the leak will be illuminated. Accordingly, even small leaks may be quickly, easily and reliably located for repair.

7 Claims, 2 Drawing Sheets

METHOD FOR DETECTING LEAKS IN A FLUID SYSTEM

BACKGROUND OF THE INVENTION

1. Field of the Invention

This invention relates to a method by which smoke is produced by a smoke generating machine and used to detect leaks (e.g. holes) in a fluid system. The method disclosed herein has particular application for detecting the presence and location of small leaks by leaving a fluorescent trace at the site of the leak.

2. Background Art

It is known to generate smoke within a sealed chamber of a smoke generating machine so that the smoke can be delivered to a fluid system under test in order to detect the presence and location of leaks by visually inspecting the system for any smoke escaping therefrom. By way of example, our prior U.S. Pat. No. 5,922,944 issued Feb. 9, 1999 described such a smoke generating machine that has particular application for producing smoke to identify the presence and location of relatively large leaks in the fluid system.

However, it has been found that in situations where the leaks to be identified are of very small size, a correspondingly small volume of smoke may escape through the hole. In other cases, the velocity of the smoke which escapes the leak may be so high as to make the smoke substantially invisible. As a consequence of the foregoing, small leaks in a fluid system under test may escape detection and repair with the obvious results that the system will operate in an inefficient manner.

In the past, attempts have been made to use a fluorescent dye to accurately locate small leaks in certain air transporting systems. For example, a fluorescent dye has been used successfully to locate leaks in various refrigeration and air conditioning systems. Reference may be made to U.S. Pat. No. 5,918,269 issued Jun. 29, 1999 for an example of a particular dye which is suitable to leave a fluorescent trace at the site of a leak. In this case, the system coolant (i.e. freon) acts a carrier for the dye. Without a suitable carrying agent, it would not be possible to cause the dye to traverse the system so as to mark the location of all of the leaks.

However, there are other air transporting systems, particularly those found in motor vehicles, which do not use a carrier agent. That is to say, the air which traverses these systems is not, and of itself, capable of functioning as a carrier to transport the fluorescent dye past the sites of the leaks. While attempt has been made to vaporize the dye into a mist to improve flow conditions, these attempts have proven to be largely unsuccessful.

Accordingly, what is needed is a reliable, easy to use means of locating relatively small leaks in an air transporting system, such as those found in a motor vehicle, by causing a fluorescent dye to be carried through the system so as to leave a visible trace at the site of the leak, which trace may be quickly detected under ultraviolet light.

SUMMARY OF THE INVENTION

In a method to accomplish the foregoing, it has been found that smoke functions as a suitable agent to carry a fluorescent dye through a fluid (e.g. air) system so as to leave a fluorescent trace at the site of each leak. By way of example, a smoke generating machine may be coupled to the evaporative or air brake system of a motor vehicle to locate small holes therein. The smoke generating machine includes a sealed chamber which contains a supply of non-toxic petroleum based oil. In accordance with the present invention, a commercially available fluorescent dye is mixed into the oil within the sealed chamber. A resistive heating grid extends laterally across the chamber of the smoke generating machine above the mixture of oil and dye. A supply of air or, in the alternative, a non-flammable gas (e.g. nitrogen) is delivered to the chamber by way of an air inlet tube. Some of the mixture of oil and dye is drawn into the air inlet tube and blown outwardly therefrom towards the heating grid. As the mixture strikes the heating grid, it is instantaneously vaporized into smoke. The rising smoke within the chamber is delivered via an air outlet tube to the system to be tested. The smoke acts as a reliable carrier of the fluorescent dye through the system and past the site of any leak.

As the smoke from the smoke generating machine travels through the fluid system under test, some of the smoke will escape through a leak (e.g. a hole). The smoke will condense as it escapes through the hole, and the fluorescent dye that is carried by the smoke will leave a detectable trace surrounding the hole. The hole may now be quickly, easily and accurately detected by simply running a source of ultraviolet light along the system. In the event that the system contains a hole, the ultraviolet light will illuminate the fluorescent trace left by the dye which escapes with the smoke through the hole. The trace will now be visible, whereby the presence of the hole can be located and repaired.

DETAILED DESCRIPTION

Figure 1:
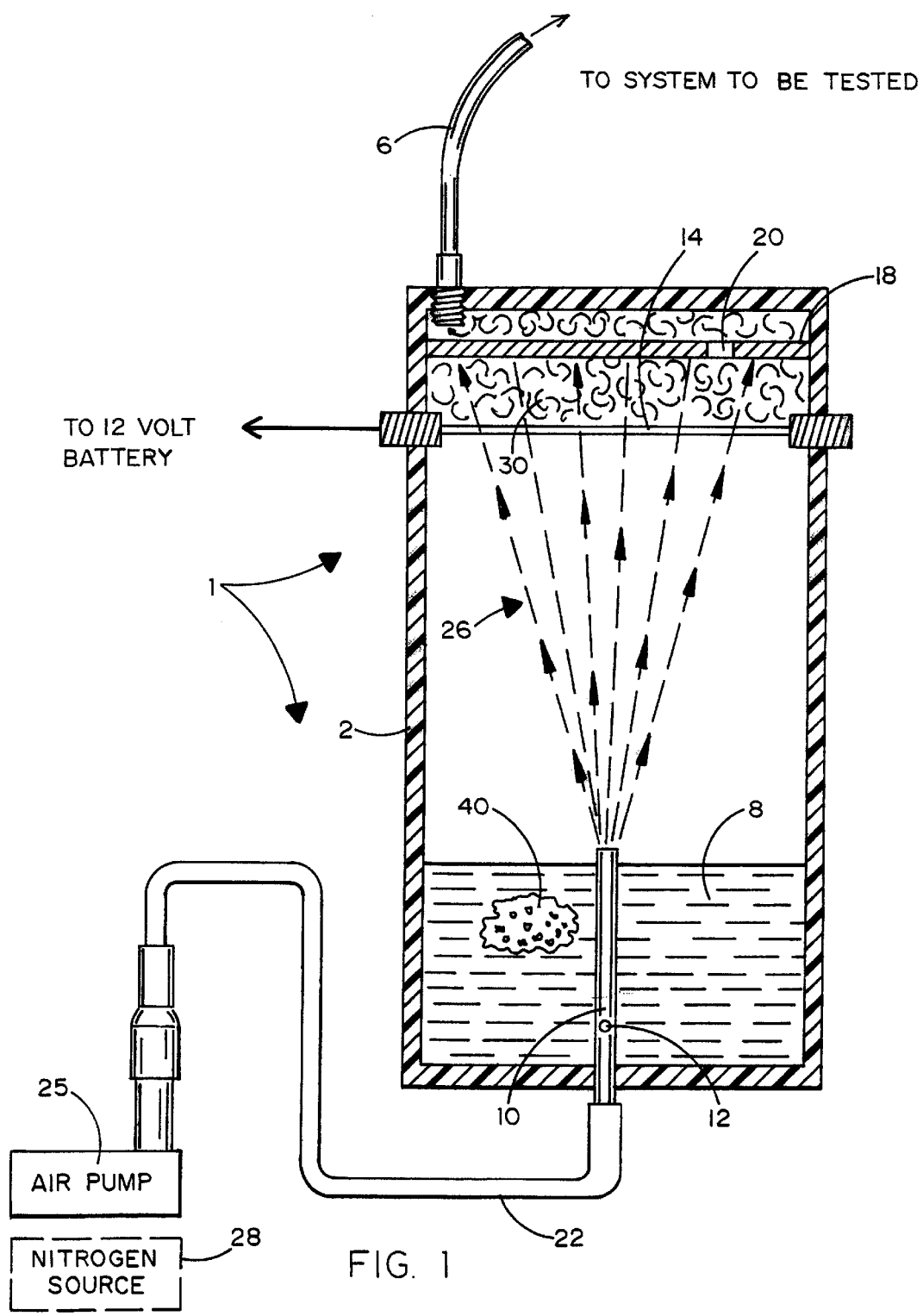
FIG. 1 shows a smoke generating machine within which a mixture of oil and fluorescent dye is vaporized to produce a supply of smoke to be delivered to a fluid (e.g. air) system under test for leaks.

Referring to drawings, there is shown in FIG. 1 a smoke generating machine 1 that is capable of generating a supply of smoke to be delivered to a fluid (e.g. air) system under test via a smoke outlet line 6 so that the fluid system can be visually inspected for leaks. By way of example only, the smoke apparatus 1 may be coupled to the evaporative or air brake system of a motor vehicle. The smoke generating machine 1 of FIG. 1 has been described in detail in our U.S. Pat. No. 5,922,944 issued Jul. 13, 1999, the teachings of which are incorporated herein by reference. Therefore, a full description of the smoke generating machine 1 will not be provided.

Briefly, however, the smoke generating apparatus 1 includes a sealed chamber 2 which contains a non-toxic petroleum based oil supply 8. An air inlet tube 10 projects upwardly from the bottom of the chamber 2 and extends above the oil supply 8. Inlet tube 10 communicates with an external air compressor or pump 25 through a wall of the chamber 2 by means of an air supply line 22. In the alternative, the air inlet tube 10 may be coupled to a source 28 of non-flammable gas, such as nitrogen, or the like, so that a relatively safe, non-explosive environment can be established, especially for use in volatile situations, such as in systems which transport a flammable liquid (e.g. a fuel tank, or the like).

As inlet orifice 12 is formed in the air inlet tube 10 so as to lie within the oil supply 8 immediately above the bottom of chamber 2. A resistive heating grid (e.g. a coil) 14 extends laterally across the sealed chamber 2 and is electrically connected to a 12 volt battery by means of a manually operated push button switch (not shown). A fluid baffle 18 having a smoke outlet orifice 20 formed therein extends laterally across the sealed chamber 2 above the heating grid 14. The aforementioned smoke outlet line 6 communicates with the outlet orifice 20 through the top wall of the sealed chamber 2.

In operation, when the push button switch is closed, the battery supplies current to heat the heating grid 14, and the air compressor 25 delivers air into the sealed chamber 2 via the air supply line 22 at approximately 14 liters/minute to cause some of the oil supply 8 within the chamber 2 to be drawn, by means of suction, through inlet orifice 12 and into the air inlet tube 10. A mixture 26 of air and oil is then blown upwardly and outwardly from the air inlet tube 10 towards and into contact with the heating grid 14 whereby the oil is vaporized into smoke 30. The rising smoke 30 travels through the outlet orifice 20 in fluid baffle 18 for receipt by the smoke outlet line 6. Accordingly, the smoke in outline 6 is conveyed to the fluid system to be tested so that the integrity of the system may be visually inspected for leaks depending upon the absence or presence of smoke escaping from a hole or similar leak formed therein.

However, it may be difficult to be able to visually detect smoke emerging from very small holes in the fluid system under test so as to be able to accurately pinpoint the location of such a hole in need of repair. In other cases, the down stream pressure of the smoke within the system to be tested may be so low that only a very small amount of smoke escapes from the hole. In yet other cases, the down stream pressure of the smoke may be so high that the smoke exists the hole at a correspondingly high rate so as to be essentially undetectable. In all of the situations described above, it may become time consuming to find all of the holes in the fluid system in need of repair. In fact, it is possible that one or more holes could escape detection altogether.

In accordance with the present improvement, a method is described to be used in combination with the smoke generating machine 1 of FIG. 1 to overcome the aforementioned problems in detecting leaks in a system having one or more very small holes or where there is either too much or too little pressure driving the smoke through the system and to the site of a hole. More particularly, it has been found that all of the holes in a fluid system can be reliably detected, regardless of the size of the hole or the pressure within the system under test, by adding a dye (designated 40 in FIG. 1) to the oil supply 8 within the sealed chamber 2 of smoke generating machine 1.

In this regard, it has been found that the smoke 30 into which the oil supply 8 is vaporized functions as a carrier for the dye 40. Establishing a suitable carrier is important so that the dye 40 can be transported with the smoke 30 into the smoke outlet line 6 and through the fluid system under test so as to leave a visible trace at each of the holes in need of repair. A fluorescent dye 40 is preferable for leaving an identifiable trace (designated 54 in FIG. 2) at the site of each hole in need of repair.

In particular, the fluorescent dye 40 should have high flash and boiling points to avoid a premature breakdown when the oil supply 8 to which the dye is added is vaporized into smoke by the heating grid 14 within the sealed chamber 2 of the smoke generating machine 1. A fluorescent dye having a flash point greater than 400 degrees F and a boiling point greater than 500 degrees F is preferred. The fluorescent dye 40 is added to the oil supply 8 of the sealed chamber 2 in a ratio of about 0.25 ounces of dye for each quart of oil. The dye and oil combination should be stirred for a sufficient time to ensure a uniform mixture that will not separate during periods of non-use. By way of example only, one commercially available fluorescent dye that has been found to be suitable for mixing with the oil supply 8 that is vaporized into smoke for use in marking the location of holes in the fluid system to which the smoke outlet line 6 of smoke generating machine 1 is coupled is product APD (Part No. 800) available from Corrosion Consultants, Inc. of Roseville, Mich.

Figure 2:
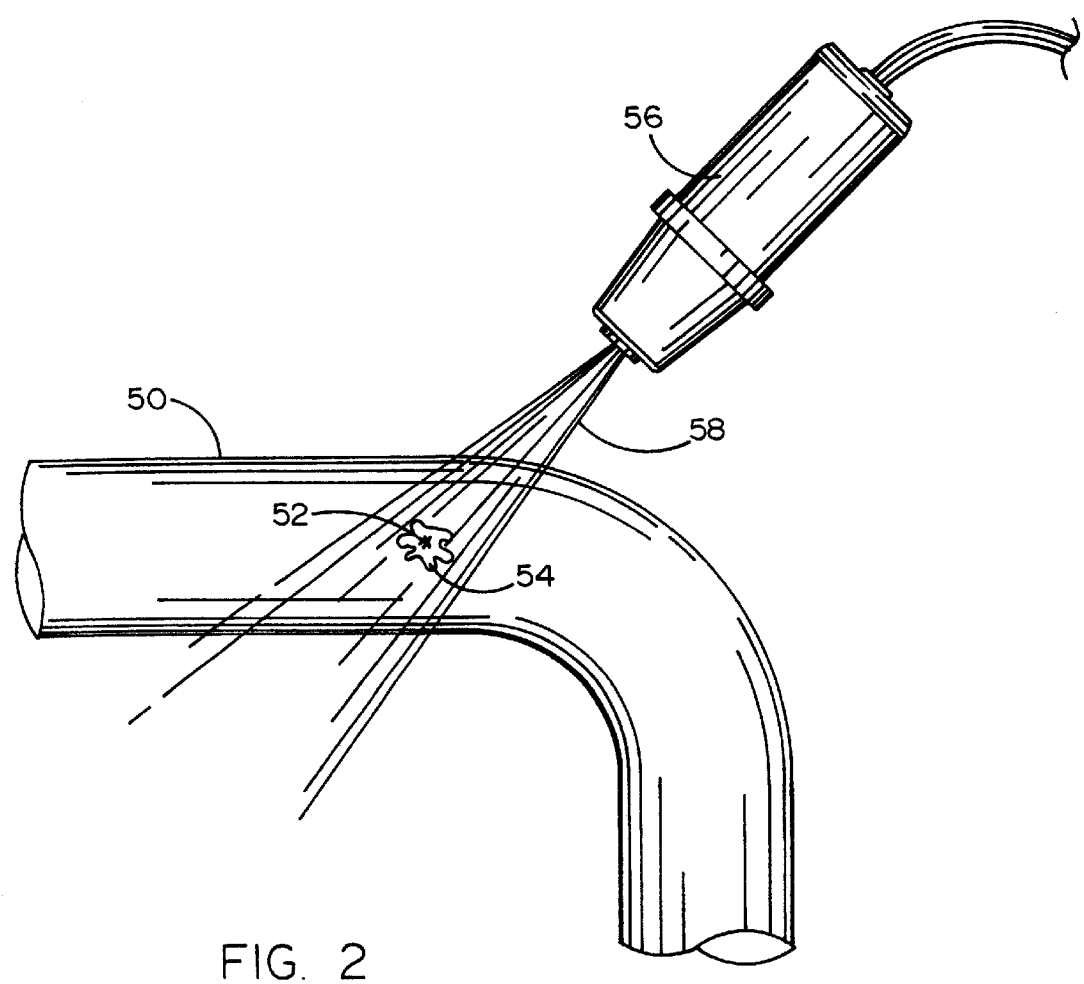
FIG. 2 is an example of a fluid system under test having a leak that is surrounded by a fluorescent trace that is left by the fluorescent dye which is carried by the smoke as it escapes through the leak.

Referring concurrently to FIGS. 1 and 2 of the drawings, a portion of a fluid system under test is represented by an air carrying hose 50 (best shown in FIG. 2) or similar conduit of the kind typically found in a motor vehicle that is susceptible to leaks. However, it is to be understood that the advantages of this invention are not limited to fluid systems which comprise the air carrying hose 50, and any other fluid system which normally transports a working gas or liquid may be tested for leaks according to the teachings herein, provided that the system is capable of receiving the fluorescent dye 40 on a carrier of smoke 30 that is produced after the dye and the oil supply are first mixed together and the oil supply is then vaporized and delivered to the system.

As the smoke 30 from the smoke generating machine 1 of FIG. 1 travels through the fluid system under test, including the air carrying hose 50, some of the smoke will escape through each hole 52. The smoke will condense as it escapes through the hole 52, and the fluorescent dye that is carried by the smoke will leave a detectable trace 54 surrounding the hole. The hole 52 in the hose 50 may now be quickly, easily and accurately detected by running a source 56 of ultraviolet light 58 along the hose 50. In the event that the hose 50 contains a hole 52, the ultraviolet light 58 will illuminate the fluorescent trace 54 left by the dye which escapes through the hole 52 with the smoke carrier. The trace 54 will now be visible, whereby the presence of the hole 52 in need of repair can be accurately located.

By virtue of the method described above, it is not necessary to actually see the smoke which exists a hole to identify the presence and location of a leak. Moreover, the user will now have an easy to use and reliable means to locate all of the leaks in the fluid system under test regardless of size. While the smoke produced by our smoke generating machine is ideally suited for finding relatively large holes in the manner described in our aforementioned U.S. Pat. No. 5,922,944, the smoke produced by our smoke generating machine can now also be used to locate holes of relatively small size according to the teachings of this invention by mixing a commercially available fluorescent dye into the oil supply and then vaporizing the oil to produce a carrier by which to transport the dye through the fluid system under test.

What is claimed is:

1. A method for detecting leaks in a fluid system to be tested in a volatile potentially explosive environment, said method comprising the steps of:

adding a fluorescent dye to a supply of oil to form a uniform mixture;

locating a heating element in a sealed chamber;

blowing at least some of said uniform mixture of oil and fluorescent dye towards said heating element within said sealed chamber by means of a non-combustible nitrogen gas delivered under pressure to said mixture;

heating the blown mixture by said heating element so that said oil is vaporized into smoke within said sealed chamber to create a carrier for said fluorescent dye, said non-combustible nitrogen gas preventing dieseling within said sealed chamber and the possibility of an explosion at the volatile potentially explosive environment in which the fluid system will be tested;

delivering said smoke and said fluorescent dye carried thereby to the fluid system under test, whereby said smoke will exit a leak in the fluid system and said fluorescent dye will leave a fluorescent trace around the leak; and shining ultraviolet light on the fluid system under test to illuminate the trace left by the fluorescent dye around the leak.

2. The method for detecting leaks recited in claim 1, including the additional steps of placing the uniform mixture of oil and fluorescent dye within the sealed chamber and heating said at least some of the mixture by means of said heating element located within said sealed chamber.

3. The method for detecting leaks recited in claim 2, including the additional step of locating said heating element within said sealed chamber above said uniform mixture of oil and fluorescent dye.

4. The method for detecting leaks recited in claim 2, including the additional step of connecting a gas inlet tube to a source of said non-combustible nitrogen gas, said gas inlet tube communicating with said uniform mixture of oil and fluorescent dye within said sealed chamber to deliver the non-combustible nitrogen gas under pressure from said source to said mixture for blowing said at least some of said mixture towards said heating element.

5. The method for detecting leaks recited in claim 4, wherein said gas inlet tube has an inlet orifice formed therein and located within said uniform mixture of oil and fluorescent dye within said sealed chamber, said gas inlet tube extending above said mixture so that said at least some of said mixture is suctioned through said inlet orifice and blown towards said heating element by means of the non-combustible nitrogen gas delivered under pressure to said mixture by said gas inlet tube from said source thereof.

6. The method for detecting leaks recited in claim 2, including the additional step of connecting a smoke outlet line to communicate with said sealed chamber at a location above said uniform mixture of oil and fluorescent dye so that the smoke produced when said at least some of said mixture is vaporized is conveyed to the fluid system under test at the volatile potentially explosive environment via said smoke outlet line.

7. The method recited in claim 1, wherein the fluid system to be tested for leaks at the volatile potentially explosing environment is the evaporative system of a motor vehicle through which a working gas or liquid is transported under pressure.

\* \* \* \* \*

(12) EX PARTE REEXAMINATION CERTIFICATE (8525th)
United States Patent
Pieroni et al.

(10) Number: US 6,439,031 C1
(45) Certificate Issued: Sep. 13, 2011

(54) METHOD FOR DETECTING LEAKS IN A FLUID SYSTEM

(75) Inventors: Kenneth Alan Pieroni, Fullerton, CA (US); Denise Yvette Haddad, Mission Viejo, CA (US); Jim Eli Saffie, Santa Monica, CA (US)

(73) Assignee: Envirotech, Inc., Costa Mesa, CA (US)

Reexamination Request:
No. 90/011,545, Mar. 7, 2011

Reexamination Certificate for:
Patent No.: 6,439,031
Issued: Aug. 27, 2002
Appl. No.: 09/385,050
Filed: Aug. 30, 1999

(51) Int. Cl.
*G01M 3/20* (2006.01)
*G01M 3/22* (2006.01)

(52) U.S. Cl. ....................................................... 73/40.7
(58) Field of Classification Search ................... None
See application file for complete search history.

(56) References Cited
U.S. PATENT DOCUMENTS
3,361,547 A 1/1968 Packo 6,439,031 B1 8/2002 Pieroni et al.

FOREIGN PATENT DOCUMENTS

GB 640266 7/1950
GB 1258266 12/1971

OTHER PUBLICATIONS

U.S. Appl. No. 09/385,050, filed Aug. 30, 1999.
U.S. Appl. No. 09/385,050; amendment of Jun. 4, 2005.
U.S. Appl. No. 09/385,050; amendment of Jan. 24, 2002.
U.S. Appl. No. 09/385,050; Notice of Allowability; May 15, 2002.

*Primary Examiner* — Alan Diamond

(57) ABSTRACT

A method for detecting leaks in a fluid system such as, but not limited to, the evaporative or air brake system of a motor vehicle. A smoke generating machine produces a supply of smoke to be delivered to the system under test. At least some of a mixture of oil and fluorescent dye is heated and vaporized into smoke within a sealed chamber. The smoke functions as a carrier for the dye. Some of the smoke which is delivered to the system under test from the chamber will exit a leak (e.g. a hole), and the fluorescent dye carried by the smoke will leave a flourescent trace around the leak. By shining ultraviolet light along the system under test, the fluorescent trace around the leak will be illuminated. Accordingly, even small leaks may be quickly, easily and reliably located for repair.

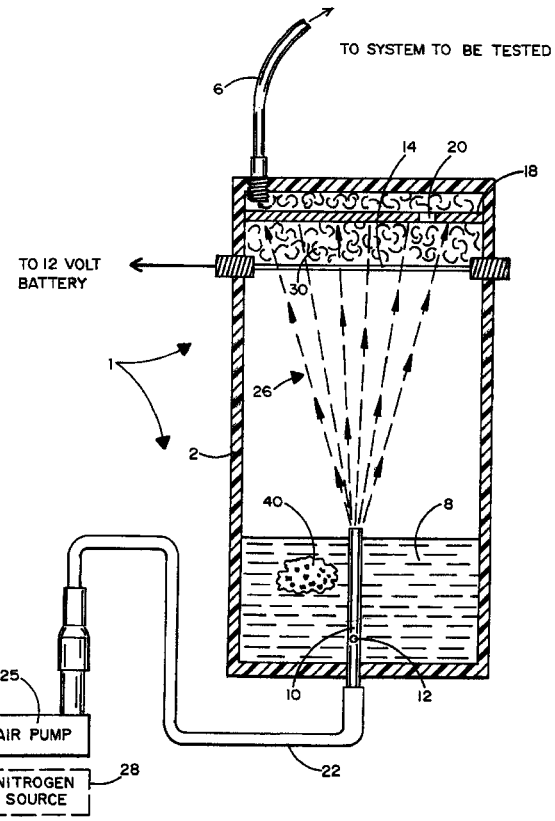

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

\* \* \* \* \*